United States Patent [19]
de Barros et al.

[11] Patent Number: 5,721,796
[45] Date of Patent: Feb. 24, 1998

[54] OPTICAL FIBER CROSS CONNECT WITH ACTIVE ROUTING FOR WAVELENGTH MULTIPLEXING AND DEMULTIPLEXING

[75] Inventors: Miriam R. de Barros, Campinas, Brazil; Lars Erik Eskildsen, Fair Haven, N.J.; Gerald Nykolak, Long Island City, N.Y.; Ashish Madhukar Vengsarkar, Berkeley Heights, N.J.; Torben N. Nielsen, Somerset, N.J.; Tawee Tanbun-Ek, Califon, N.J.

[73] Assignee: Lucent Technologies Inc., Murray Hill, N.J.

[21] Appl. No.: 668,196

[22] Filed: Jun. 21, 1996

[51] Int. Cl.[6] .................................................. G02B 6/34
[52] U.S. Cl. .................................................. 385/37
[58] Field of Search .................. 385/27, 32, 2, 385/129, 8, 10, 12, 31, 14, 33, 37, 39; 372/12, 20, 22, 64, 92, 99; 359/125, 130, 133, 152

[56] References Cited

U.S. PATENT DOCUMENTS

| | | | |
|---|---|---|---|
| 4,479,687 | 10/1984 | Kapany et al. | 385/33 |
| 4,900,119 | 2/1990 | Hill et al. | 385/27 |
| 4,910,737 | 3/1990 | Payne et al. | 385/31 |
| 5,511,142 | 4/1996 | Horie et al. | 385/129 |
| 5,513,196 | 4/1996 | Bischel et al. | 372/22 |
| 5,555,118 | 9/1996 | Hubber | 385/24 |

*Primary Examiner*—Akm E. Ullah

[57] ABSTRACT

In accordance with the invention a multiwavelength optical fiber cross connect is provided with an active all-fiber optical router for multiplexing/demultiplexing. The router is comprised of one electronic component—a phase controller—and four fiber components: 1) a fiber directional coupler, 2) a fiber reflective grating filter, 3) a fiber tap, and 4) a fiber phase modulator. The application describes how to make optical routers from these components ranging in complexity from a single wavelength drop router to an N-port, N-wavelength router for add/drop multiplexing. The application also describes how optical wavelength routers can be combined to create optical fiber Cross connect (OXCs), ranging in complexity from 2×2 single wavelength OXCs to NXN, M-wavelength OXCs.

7 Claims, 10 Drawing Sheets

OPTICAL FIBER CROSS CONNECT WITH ACTIVE ROUTING FOR WAVELENGTH MULTIPLEXING AND DEMULTIPLEXING

FIELD OF THE INVENTION

The present invention relates to an optical fiber cross connect and, in particular, to a multiwavelength optical fiber cross connect having an active all-fiber optical router for wavelength multiplexing and demultiplexing.

BACKGROUND OF THE INVENTION

In a multiwavelength optical fiber transmission system, an optical fiber simultaneously carries many different communications channels in light of respectively different wavelengths. In the use of such a system it is frequently required to add channels to the transmission fiber or to selectively remove channels from the fiber. Channels are added for long distance transmission and removed at the destination. Moreover such systems are advantageously redundant for survivability, i.e. there are multiple fiber paths to the same destination. If one or more paths are lost or overloaded, channels must be removed from the lost or overloaded path and added to another.

Such optical routing for add/drop multiplexing is typically accomplished by expensive bulk optical components or integrated planar waveguides. The disadvantage of these conventional routers is not only their expense but also their instability and mechanical unreliability. They also require numerous fiber-to-device interfaces which are tedious to make and lossy in operation. Accordingly there is a need for a new optical router free of bulk optical or integrated optical components which can be readily fabricated of inexpensive optical fiber components.

SUMMARY OF THE INVENTION

In accordance with the invention a multiwavelength optical fiber cross connect is provided with an active all-fiber optical router for multiplexing/demultiplexing. The router is comprised of one electronic component—a phase controller—and four fiber components: 1) a fiber directional coupler, 2) a fiber reflective grating filter, 3) a fiber tap, and 4) a fiber phase modulator. The application describes how to make optical routers from these components ranging in complexity from a single wavelength drop router to an N-port, N-wavelength router for add/drop multiplexing. The application also describes how optical wavelength routers can be combined to create optical fiber cross connects (OXCs), ranging in complexity from 2×2 single wavelength OXCs to N×N, M-wavelength OXCs.

BRIEF DESCRIPTION OF THE DRAWINGS

The advantages, nature and various additional features of the invention will appear more fully upon consideration of the illustrative embodiments now to be described in detail in connection with the accompanying drawings.

In the drawings.

Figure 1:
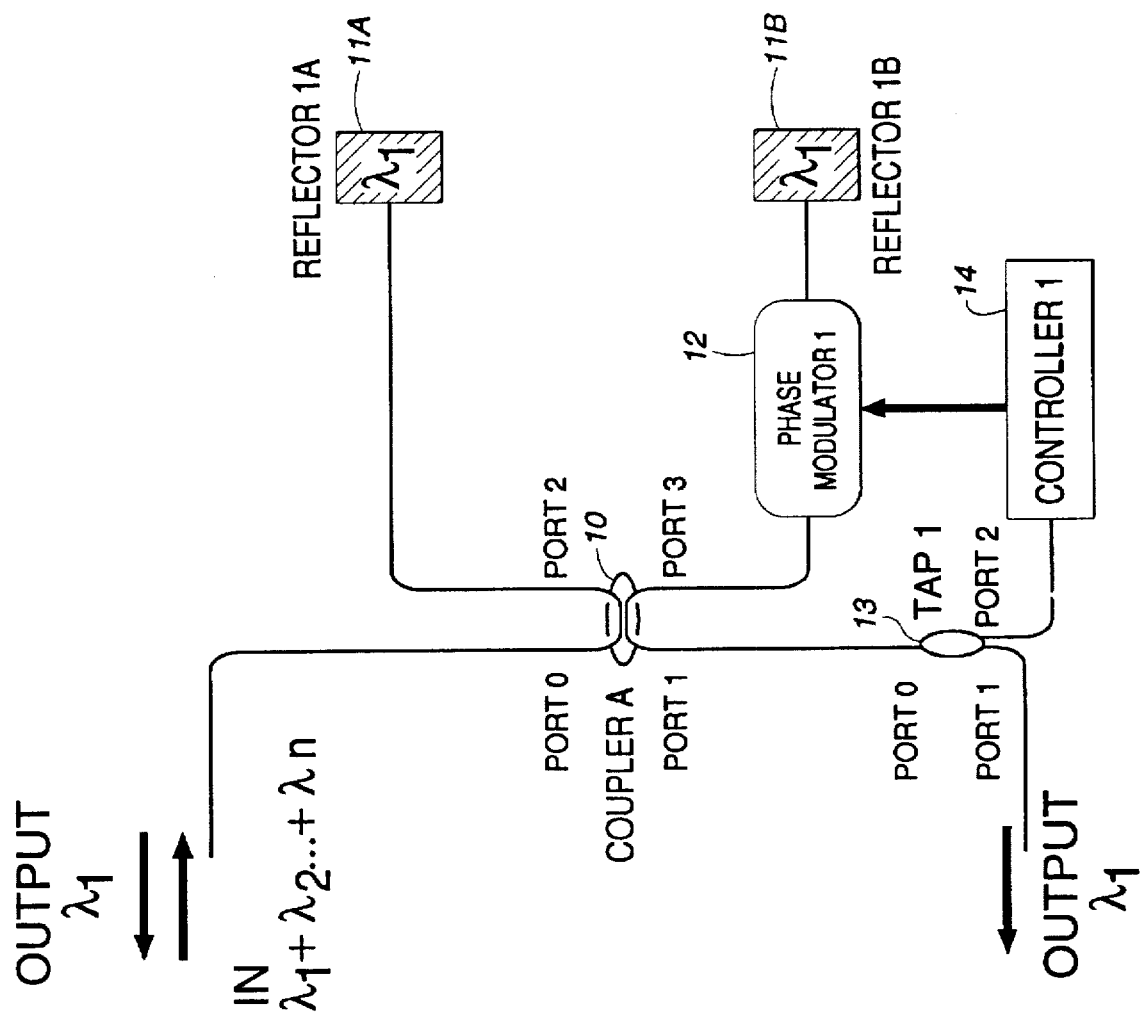
FIG. 1 is a schematic diagram of a single wavelength all-fiber active optical drop router.

It is to be understood that these drawings are for purposes of illustrating the concepts of the invention and are not to scale.

DETAILED DESCRIPTION

This description is divided into four parts. Part I describes the five components which make up the inventive optical routers. Part II describes all-fiber optical drop routers, and Part III describes all-fiber optical routers for add/drop multiplexing. Part IV describes three-port optical routers made from 3×3 fiber couplers.

I. Components

The inventive optical cross connect uses five types of components. The first component is a fiber 2×2 directional coupler. This is a conventional device described in detail in Paul E. Green Jr., "Fiber Optics Networks", Ch. 3.11, pg 70–75. Prentice Hall, ISBN 0-13-319494-2, which is incorporated herein by reference. It is a two input-two output device wherein light at either input port (typically designated ports 0 and port 1) is directed to both of the two output ports (ports 2 and 3), with some split ratio (usually 50%).

The second component is a fiber reflective grating filter ("reflector"). This is a well known device described in G. Meltz, W. W. Morey and W. H. Glenn, "Formation of Bragg Gratings in Optical Fibers by Transverse Holographic Method", Optics Letters, Vol. 14, No. 15, Aug. 1, 1989, pg 823–825, which is incorporated herein by reference. It comprises a length of fiber into which a reflective grating is written. Light which is resonant with the filter center wavelength is reflected backwards. Light at other wavelengths, not resonant with the filter, is transmitted through the grating with substantially no loss. For the resonant wavelength, the reflectivity is substantially 100%.

The third component is a fiber optic tap. A preferred form of tap is described in the aforementioned publication by Paul E. Green Jr. It has one input port (designated port 0) and two output ports (1 and 2). Light from the input port is directed to both of the two output ports with some split ratio (usually 1–10%). The tap is used to sample a small amount of optical power from an input fiber. The fiber optic tap is similar to the 2×2 directional coupler, with one input fiber removed.

The fourth component is a fiber phase modulator. This is an optical component which changes the phase of an optical signal by elastically stretching the fiber. A preferred fiber phase modulator using a piezoelectric transducer to stretch a winding of fiber is described in the aforementioned publication by Paul E. Green Jr. This device permits the use of an externally applied voltage to change the optical phase in a fiber.

The fifth component, which is electronic, is a phase controller. This is a well-known electronic circuit which allows the active, continuous monitoring and control of the phase of an electrical signal. A preferred phase controller circuit is the Fiber Fabry Controller marketed by Micro Optics Inc. A photodetector is connected to the input of said controller, for converting an optical signal into an electrical signal. The controller output voltage is composed of two components: a DC component which is used for phase compensation and a small amplitude sine wave (called a dither signal) which is used for phase detection.

The phase controller is used in conjunction with an interferometer. The interferometer is used to monitor optical phase. If two optical signals interfere constructively ("in-phase condition"), the interferometer has maximum output power. If the signals interfere destructively ("out-of-phase condition"), the interferometer has minimum output power. In the absence of active control and compensation of the phase, the output of the interferometer will randomly fluctuate between minimum and maximum.

The phase controller "locks" the phase of the interferometer so that the condition of a maximum or a minimum is achieved and maintained. The phase controller provides a compensating voltage to the phase modulator which compensates for any random fluctuations in the detected phase between the two interfering optical waves. Consequently, the output power of the interferometer is a stable, unchanging signal, either at a maximum or minimum.

In order to lock the phase of the interferometer, the feedback controller needs to detect part of the interferometer output so that it can extract the dither signal. Upon extracting the dither signal, the controller processes the signal to obtain phase information. This detected dither signal tells the controller what the DC voltage should be. The dither signal is required in order for the interferometer to maintain a stable, continuous output (maximum or minimum).

II. All-Fiber Active Optical Drop Routers

A. Single Wavelength Drop Router

Referring to the drawings, FIG. 1 is a schematic diagram of a single wavelength all-fiber active optical drop router. The input wavelengths $\lambda_1, \lambda_2, \ldots \lambda_n$ are present at port 0 of Coupler 10. Coupler 10 equally divides the input power and presents it at both port 2 and port 3. Port 2 of coupler 10 is connected to reflector 11A. Port 3 of coupler 10 is connected to phase modulator 12. The output of phase modulator 12 is connected to reflector 11B. The spectral response of the two reflective filters should be identical. This can be achieved by writing multiple fiber gratings simultaneously, thus insuring identical response. Port 1 of coupler 10 is connected to port 0 of tap 13 (the input to tap 13). Port 2 of tap 13 (the sample port) is connected to controller 14. Port 1 of tap 13 is the output.

In operation, the input wavelengths are equally split by coupler 10 to port 2 and port 3. Phase modulator 12 provides a small dither to the phase of the light out of port 3. Reflector 11A and reflector 11B (matched) reflect one wavelength back towards coupler 10. Both of the two reflected powers interfere at coupler 10 depending on their relative phase. Tap 13 samples the interference of the reflected powers and the dither signal. Tap 13 presents controller 14 with a sample of the interfering signal and dither signal. Controller 14 analyzes the detected dither signal and produces a compensating voltage to phase modulator 12. Controller 14 "locks" the phase, so that the two reflected powers interfere constructively at port 1. Alternatively, controller 14 "locks" the phase, so that the two reflected powers interfere destructively to produce a cancellation at port 1 of Coupler 10. In this case, the same signal is then presented at port 0 of coupler 10. Thus a single wavelength is selected by the reflective gratings and routed to either port 0 or port 1 of coupler 10.

B. Dual Wavelength Drop Router

Figure 2:
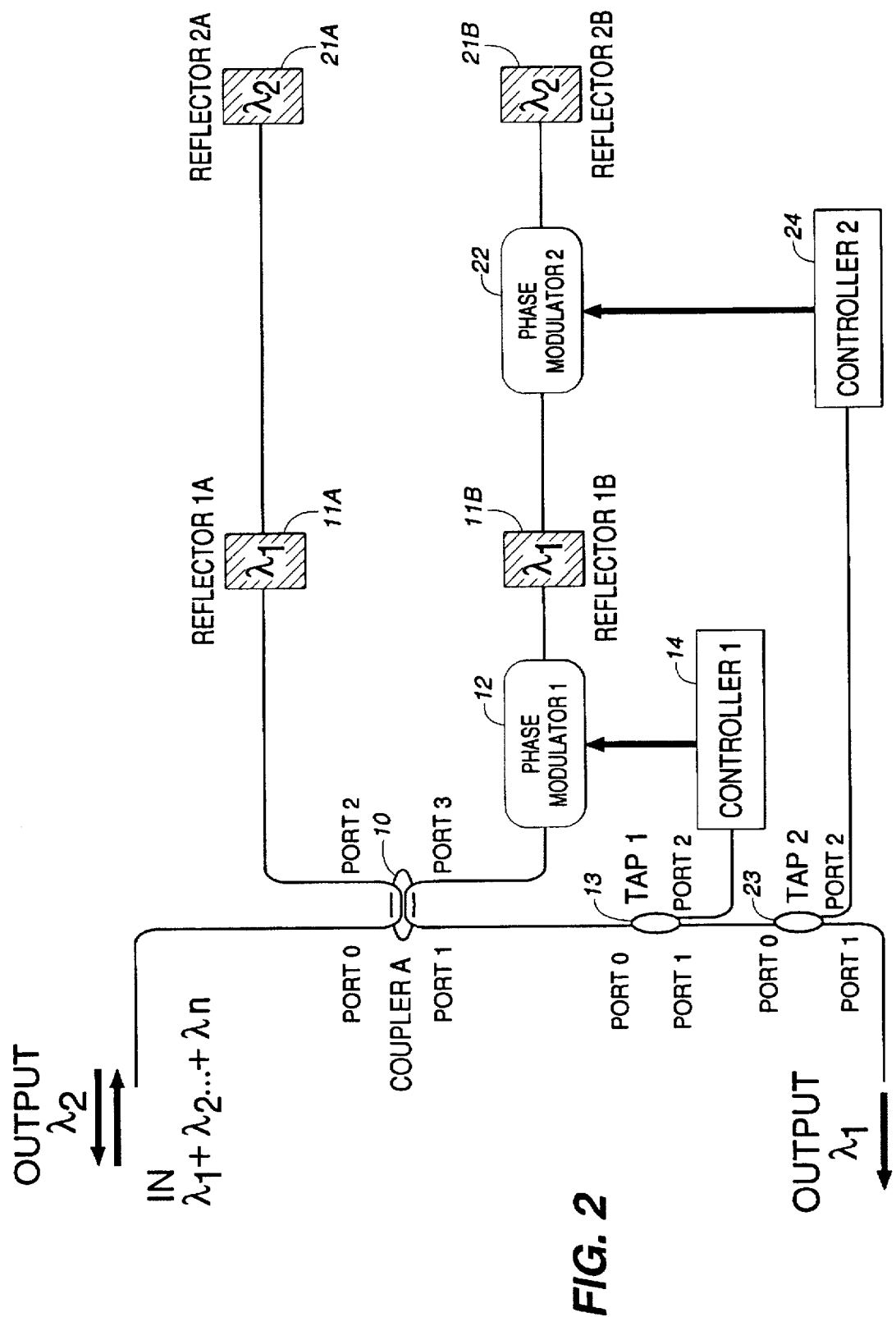
FIG. 2 is a schematic diagram of a dual wavelength drop router.

FIG. 2 shows an extension to a dual wavelength drop router. This dual wavelength configuration permits the active independent routing of 2 selected wavelengths to either of 2 output ports.

As shown in FIG. 2, the output of reflector 11A is connected to a second reflector 21A. The output of reflector 11B is connected to phase modulator 22. The output of phase modulator 22 is connected to reflector 21B. Both reflector 21A and reflector 21B reflect back the same wavelength, $\lambda_2$, which is a different wavelength than that reflected from reflectors 11A and 11B. Tap 23 presents controller 24 with a sample of the interference signal and dither signal. Controller 24 must have a dither frequency which is different from the dither frequency of controller 14. Controller 24 will process its own dither signal, just as controller 14 will process its own.

In operation, wavelength $\lambda_1$, is reflected back towards port 0 or port 1 of coupler 10. Wavelength $\lambda_2$, which was present at the input, is not reflected but is transmitted by both reflectors 11A and 11B. At the output of reflector 11A is a different reflector, 21A. At the output of reflector 11B is phase modulator 22. At the output of phase modulator 22 is reflector 21B. Both reflector 21A and 21B are identical, and they reflect wavelength $\lambda_2$. The two reflected powers from reflectors 21A and 21B interfere at coupler 10. Tap 23 provides controller 24 with interference and dither signals. Controller 24 detects and processes its own dither signal, independent of controller 14. After processing its own dither signal, controller 24 will "lock" the phase for wavelength $\lambda_2$, so that the power at wavelength $\lambda_2$, will appear at either port 0 or port 1 of coupler 10, independent of wavelength $\lambda_1$. In this way, wavelength $\lambda_2$ can be selectively routed back to either Port 0 or Port 1 of Coupler 10, independent of $\lambda_1$.

C. N Wavelength Drop Router

Figure 3:
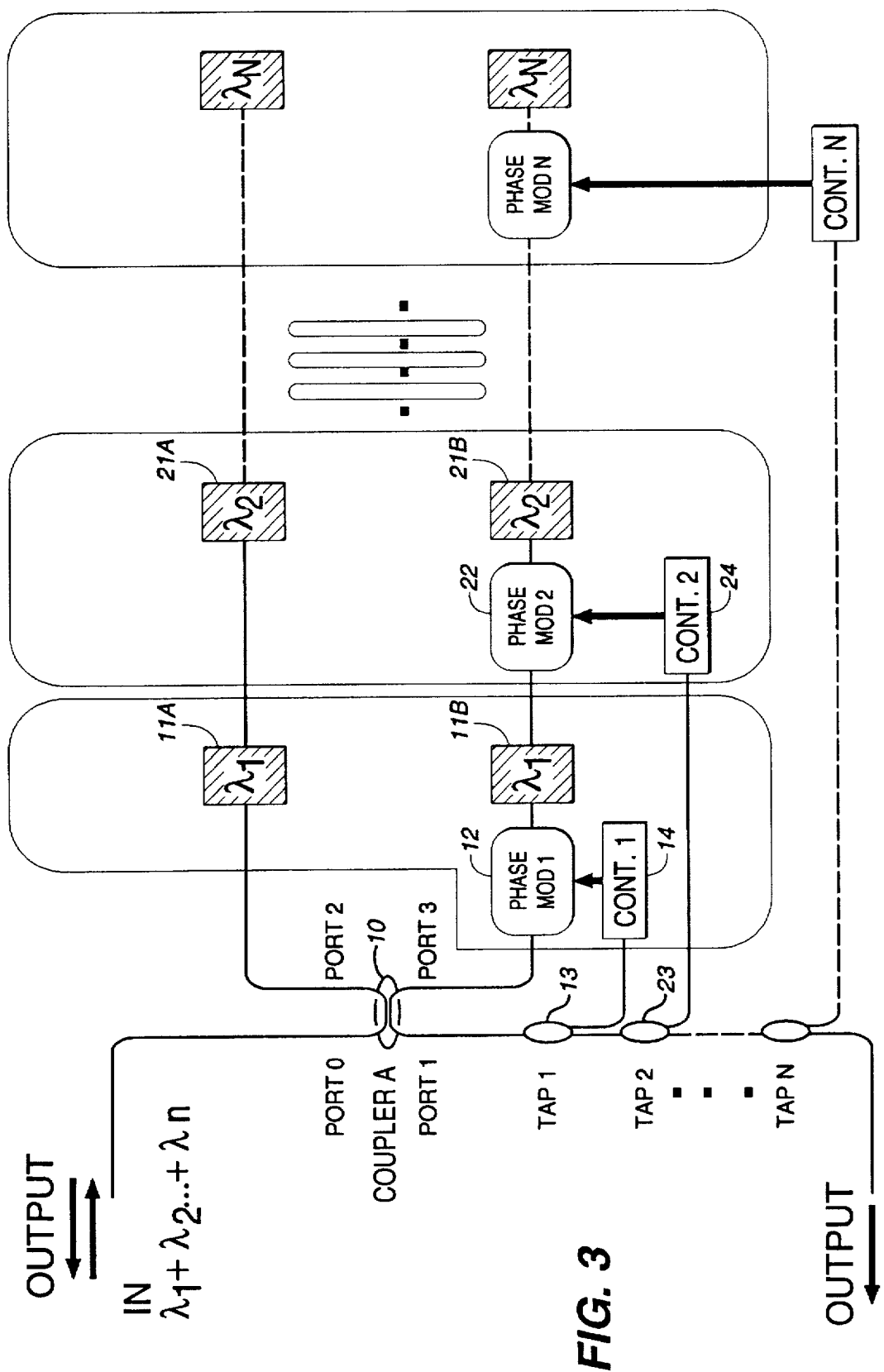
FIG. 3 is an N-wavelength drop router.

FIG. 3 shows extension of the 1 and 2 wavelength drop routers to an N-wavelength drop router. This configuration permits the active independent routing of N selected wavelengths to either one of 2 output ports.

As shown in FIG. 3, each routed wavelength requires a separate pair of reflective gratings and a separate phase modulator, controller and tap. In addition, each routed wavelength requires its own unique dither frequency.

In operation, each wavelength at the input port 0 of coupler 10 is split into equal halves at the output of coupler 10. Each wavelength is reflected back towards coupler 10 after encountering its own resonant reflective grating pair. In addition, each grating pair has its own phase modulator and controller. Each controller provide a unique dither frequency.

Controller 14 "locks" the phase for wavelength $\lambda_1$. Wavelengths $\lambda_2$ thru $\lambda_n$ pass through the reflectors for $\lambda_1$, until they encounter the reflectors for $\lambda_2$, and $\lambda_2$ is reflected back. Controller 24 "locks" the phase for Wavelength $\lambda_2$. Wavelength $\lambda_n$ passes through the previous n-1 reflectors for the previous n-1 wavelengths. Wavelength $\lambda_n$ will be reflected back after encountering its own pair of reflectors. Each one of the routed wavelengths can be sent back to either port 0 or port 1 of coupler 10, depending on whether the phase for that particular channel has been locked to a fringe maximum or a fringe minimum.

III. All-Fiber Optical Cross Connect For Add/Drop Multiplexing

In multiwavelength optical fiber transmission it is necessary to add and/or remove a selected few wavelength at specific points along the transmission fiber. These points are referred to as nodes. Nodes are locations along the optical fiber path where wavelength channels can be simultaneously added to or removed from the transmission fiber. This occurs for one or more wavelengths, while other wavelengths pass through ("continue") this node unaffected. Different nodes Add/Drop different wavelength channels. The Add-Drop-Continue functions can be defined as follows:

1) Add: a selected wavelength is added to the Output port or routed back to the Add Port.
2) Drop: a selected wavelength is routed to the either Drop port or back to the Input port.
3) Continue: "non-selected" wavelengths, which are not affected by the reflection filter continue from Input to Output, unaffected.

Add-Drop-Continue functionality at a Node location will be an important feature in future "all-optical" transmission networks.

A. Single Wavelength 2×2 Optical Cross Connect

We will now describe a novel device for performing Add-Drop-Continue, entirely within the fiber, without the use of bulk optical components or integrated planar waveguide devices. This device can be fabricated from standard "off-the-shelf" components. Because the device is not composed of any bulk optical or integrated optical components, it is relatively inexpensive and reliable. This design and its derivatives can be used for implementing an all-fiber multiwavelength optical cross connect for Add-Drop multiplexing.

Figure 4:
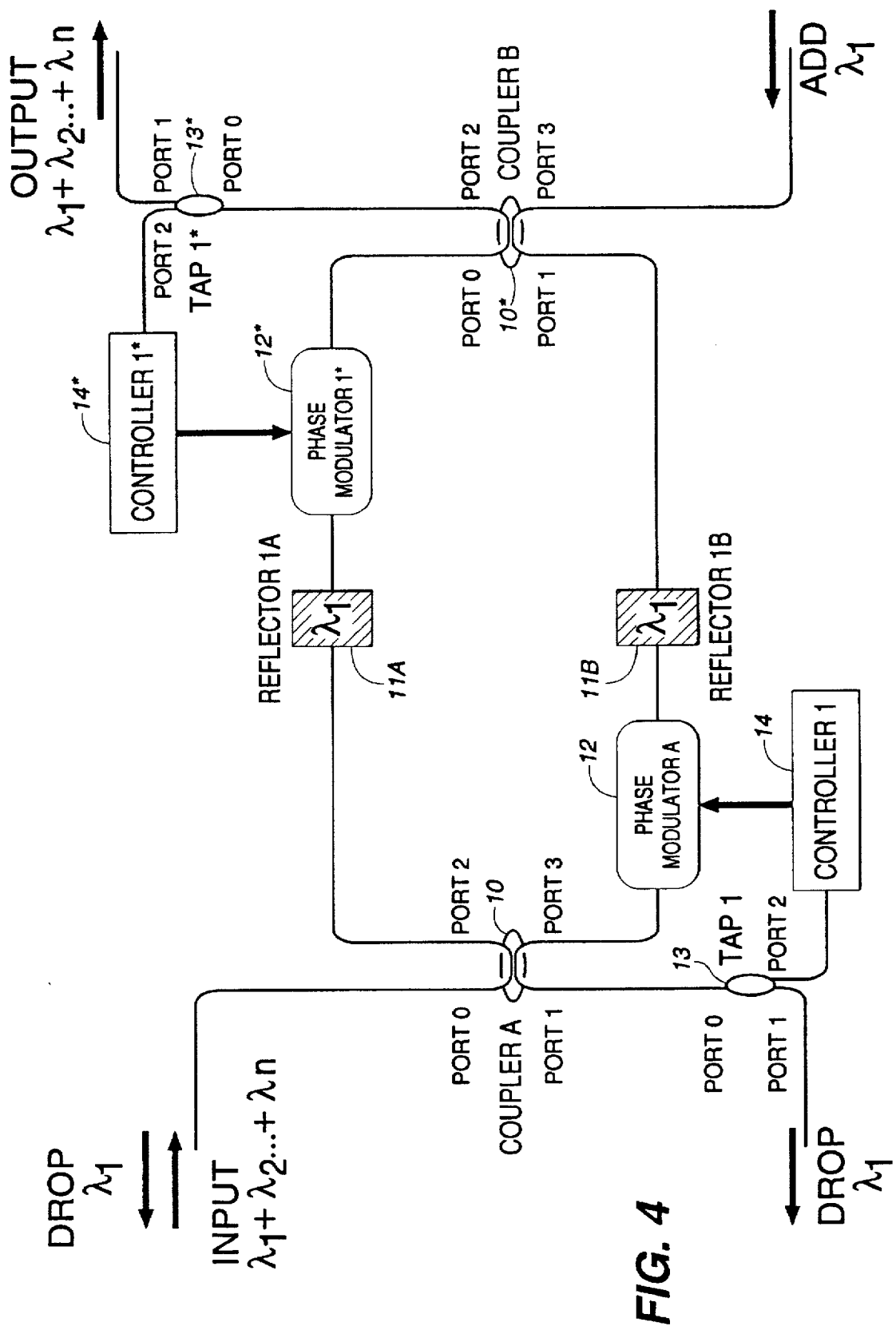
FIG. 4 is a schematic diagram of a 2×2 single wavelength all-fiber active optical cross connect.

FIG. 4 schematically illustrates a single wavelength 2×2 all fiber optical cross connect ("OXC"). The first half of FIG. 4 is substantially identical to FIG. 1, and it functions the same way. The second half of FIG. 4 is similar to the first half but "flipped over".

Port 3 of coupler 10* is the Add port for this device. Port 1 of coupler 10* is connected to reflector 11B. Port 0 of coupler 10* is connected to phase modulator 12*. The output of phase modulator 12* is connected to reflector 11A. Phase modulator 12* is controlled by controller 14*. Port 2 of coupler 10* is the output of the interferometer. Port 0 of tap 13* is the input to the tap. Port 2 of tap 13* provides the sample or tapped power from the interferometer to controller 14*. Port 1 of tap 13* is the output for the entire device.

Reflector 11A and reflector 11B are matched reflectors and reflect one wavelength, $\lambda_1$. This reflector pair serves two purposes. It selects the wavelength for the Drop port and at the same time it selects the wavelength for the Add port. This design, is essentially composed of 3 integrated interferometers. The first is formed by coupler 10* and the reflective grating pair. The second is formed by coupler 10 and the reflective grating pair. And the third is formed by coupler 10 and coupler 10*.

The "Add" function for the single wavelength 2×2 all fiber OXC for add/drop multiplexing can be described as follows. The power at port 3 of coupler 10* is predetermined to be at wavelength $\lambda_1$, resonant with the reflective filter pair 11A, 11B. The power at port 3 of coupler 10* is equally divided between port 0 and port 1 of Coupler B. The power at port 1 of coupler 10* encounters reflector 11B and is reflected backwards. The power at port 0 of coupler 10* passes through phase modulator 12*. The output of phase modulator 12* next encounters reflector 11A. The light is then reflected back towards phase modulator 12 and then back towards port 0 of coupler 10*.

The reflected light interferes at coupler 10*. Tap 13* presents controller 14* with a sample of the interfering signal and the dither signal. The dither frequency used by controller 14 for the Drop function is different from the dither frequency used by controller 14* for the Add function. Controller 14* analyzes the detected dither signal and produces a compensating signal to phase modulator 12*. Controller 14* "locks" the phase, so that the two reflected powers interfere constructively at port 2. That is, power from the Add port (port 3 of Coupler 10*) gets routed to the Output port (port 1 of tap 13*), or back to the Add port (port 3 of coupler 10*).

The "Continue" function for the single wavelength 2×2 OXC for add/drop multiplexing can be described as follows. Wavelengths present at the input, (port 0 of coupler 10) which are nonresonant with the reflective filter pair 11A, 11B are transmitted, unaffected to the Output (port 1 of Tap 13*).

Power at other wavelengths present at the input (port 0 of coupler 10) is equally divided and present at both port 2 and port 3 of coupler 10. These wavelengths pass though the interferometer formed by coupler 10 and the reflective grating pair. They see little phase change since the phase for the first interferometer is balanced and locked via wavelength $\lambda_1$, phase modulator 12 and controller 14. Next, these wavelengths pass though the reflective grating pair and encounter the second interferometer formed with coupler 10* and the grating pair. These wavelengths pass though the second interferometer. They see little phase change since the phase for the second interferometer is balanced and locked via wavelength $\lambda_1$, phase modulator 12* and controller 14*. As a result of the other wavelengths being transmitted through two balanced and locked interferometers, they will finally appear at port 2 of coupler 10*, and then at the Output port. Thus, the nonresonant wavelengths continue from input to output unaffected by either the Drop or Add functions.

In addition, the non-resonant wavelengths can be directed to either of the two ports of Coupler 10*. The reason that the non-resonant "continue" wavelength can be directed, is as follows. The added wavelength $\lambda_1$* passes through phase modular 12* twice: first after $\lambda_1$* leaves Port 0 of Coupler 10* and second, after encountering reflector 11A. $\lambda_1$* is reflected back through phase modulator 12*. This means that in order to have a "balanced" interferometer, the dropped wavelength is exactly twice as much affected by the phase modular 12* as is the continue wavelengths.

If a factor of $2\pi$ (360°) is added to the phase of the dropped wavelength $\lambda_1$* (simply by changing the voltage applied to the phase modulator 12*) there will be no net effect on the dropped channel. The dropped channel simply goes from one interference fringe peak to the next interference peak (separated by $2\pi$). However, since the "continue" wavelengths "see" only half this phase change (180°), the continue will effectively be routed from one output to the other.

In this way, all 3 functions— Add, Drop and Continue— can be selectively and independently routed. Hence the device is properly named an optical cross connect.

Figure 5:
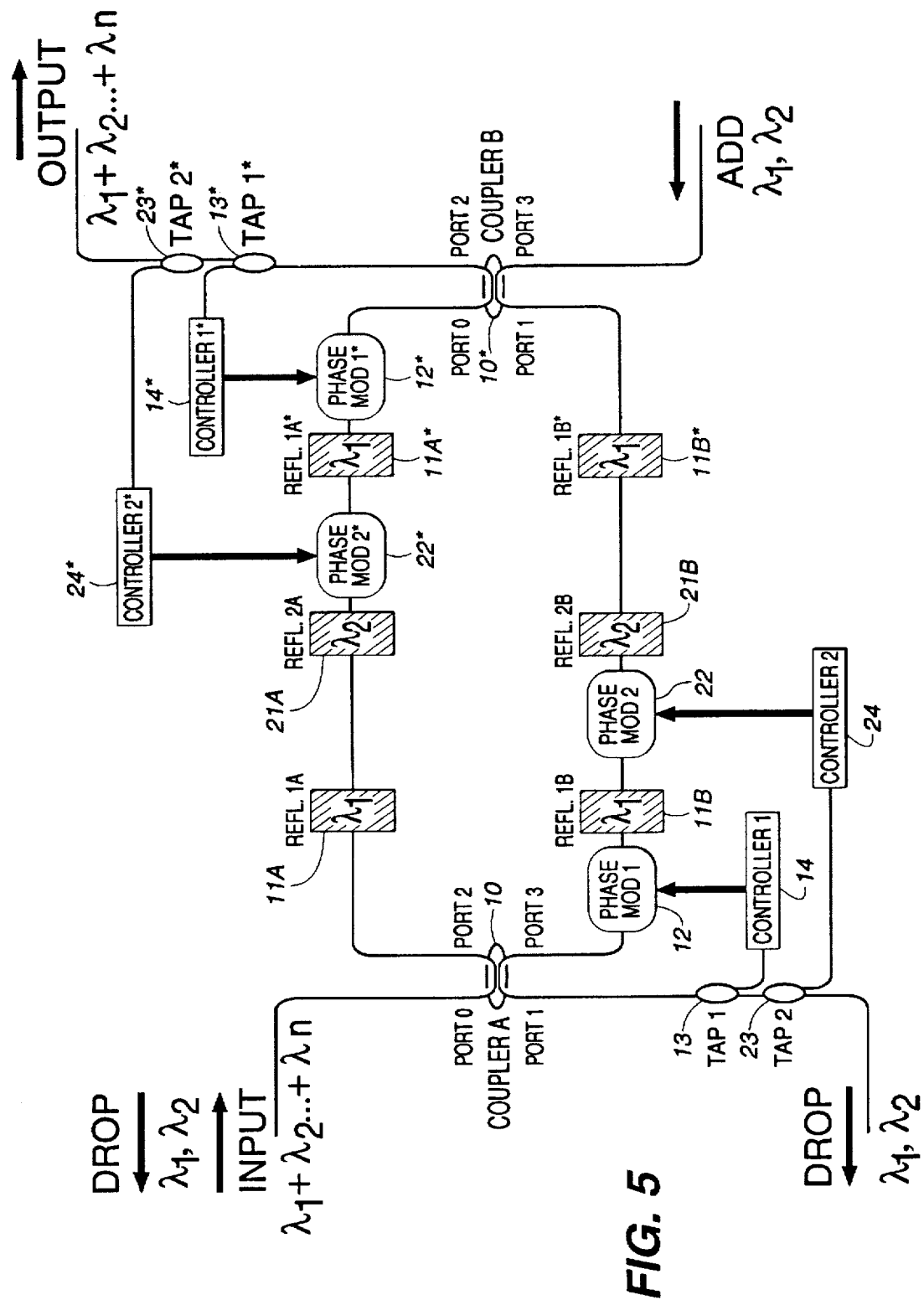
FIG. 5 is a schematic diagram of a 2×2 dual wavelength optical cross connect.

B. Dual Wavelength Router for Add/Drop Multiplexing:

FIG. 5 illustrates a dual wavelength 2×2 all-fiber OXC for Add/Drop multiplexing. The FIG. 5 configuration permits the active, independent routing of 2 selected wavelengths to either one of two ports. Two wavelengths can be independently selectively dropped or added. The other nonresonant wavelengths are transmitted from input to output unaffected.

The first Drop channel consists of an interferometer formed with coupler 10 and reflective grating pair 11A and 11B, which reflect back wavelength $\lambda_1$. The phase is balanced and locked by phase modulator 12 and controller 14. The second Drop channel is formed with coupler 10 and reflective grating pair 21A and 21B, which reflect back wavelength $\lambda_1$. The phase is balanced and locked by phase modulator 22 and controller 24. These two controllers 14,24 use different dither frequencies.

The first Add channel consists of an interferometer 5 formed with coupler 10* and reflective grating pair 11A* and 11B*, which reflect back wavelength $\lambda_2$. The phase is balanced and locked by phase modulator 12* and controller 14*. The second Add channel is formed with coupler 10* and reflective grating pair 21A and 21B, which reflect back wavelength $\lambda_2$. The phase is balanced and locked by phase modulator 22* and controller 24*. The dither frequencies of the two Add controllers are different from each other as well as the dither frequencies used by the Drop controllers.

The other non-resonant wavelengths at the Input port are transmitted though the various interferometer elements till they arrive at the output port, permitting the Continue function. As described previously, the continue wavelengths can be routed to either port 2 or port 3 of the coupler.

C. All Fiber 2×2 OXC For Add/Drop Multiplexing

Figure 6:
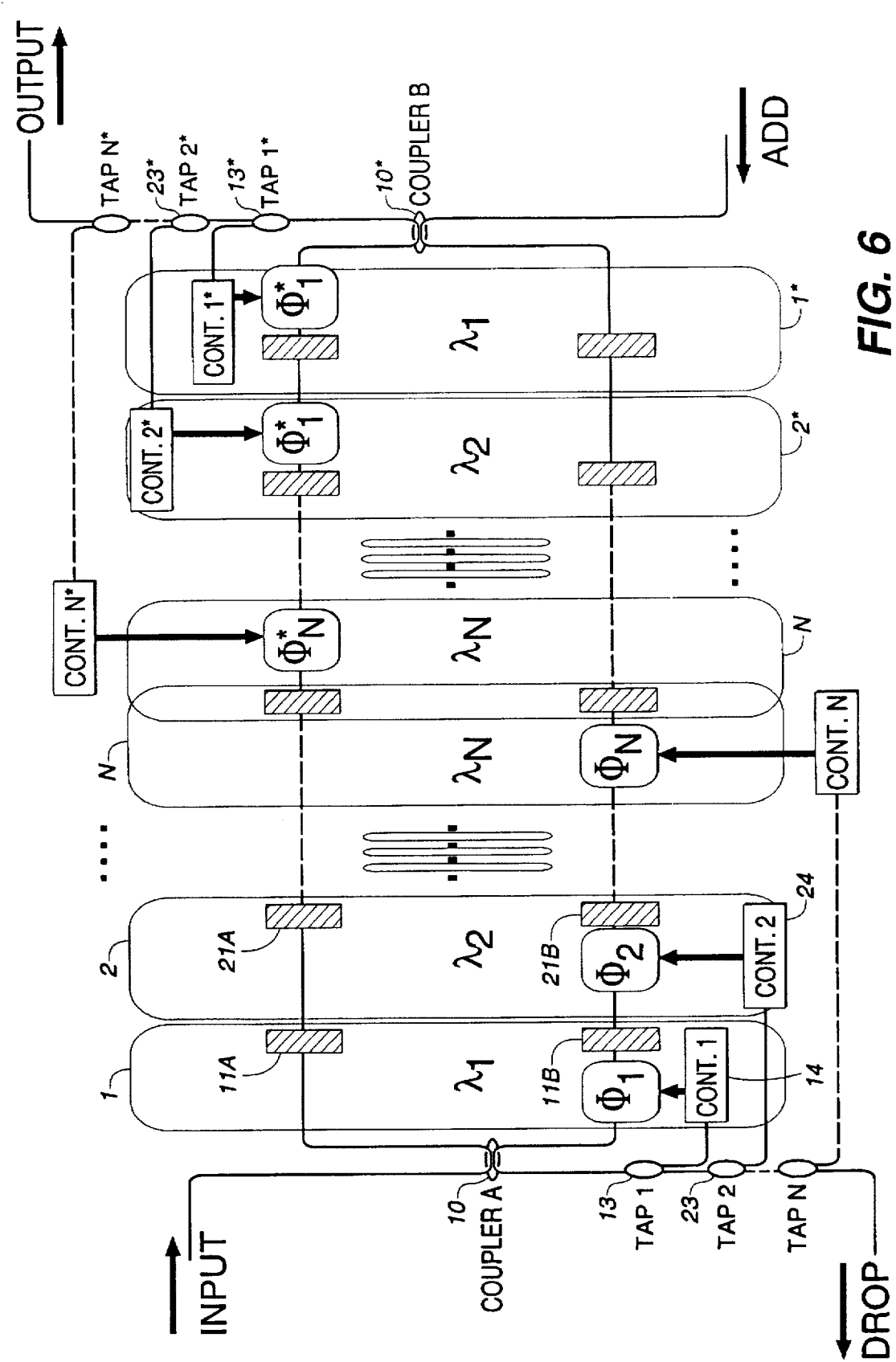
FIG. 6 is a 2×2 N-wavelength optical cross connect.

FIG. 6 shows extension of the design to simultaneously Drop N wavelengths and Add N wavelengths, while still permitting nonresonant wavelengths to Continue.

The first Drop channel consists of an interferometer formed with coupler 10 and reflective grating pair 11A and 11B, which reflect back wavelength $\lambda_1$. The second Drop channel comprises interferometer 2 formed with coupler 10 and reflective grating pair 21A and 21B, which reflect back wavelength $\lambda_2$. This continues for N interferometers to drop N wavelengths. The Nth Drop channel is interferometer N formed with coupler 10 and the Nth reflective grating pair, which reflect back wavelength $\lambda_n$. Each of the N phase controllers 14, 24, . . . uses its own unique dither frequency.

The first Add channel consists of an interferometer 1* formed with coupler 10* and reflective grating pair 11A* and 11B*, which reflect back wavelength $\lambda_1$. The second Add channel comprises interferometer 2* formed with coupler 10* and reflective grating pair 21A* and 21B*, which reflect back wavelength $\lambda_2$. This continues for N interferometers to add up to N wavelengths. The Nth Add channel is formed with coupler 10* and the Nth grating pair, which reflect back wavelength $\lambda_n$. Each of the N phase controllers 14*, 24*, . . . uses its own unique dither frequency.

The other nonresonant wavelengths at the input port are transmitted through the various interferometer elements until they arrive at the output port, permitting the Continue function. As described previously, the continue wavelengths can be routed to either port 2 or port 3 of the coupler.

IV. All Fiber 3×3 OXC

A. Additional Components

In all of the previously described fiber optic routers and OXC designs, the input and/or output couplers are 2×2 couplers consisting of 2 fibers each. It is possible to fabricate fused fiber couplers, which consist of 3 input fibers and 3 output fibers. Such a device is described in Gregor Weihs, Michael Reck, Harald Weinfurter and Anton Zeilinger, "All-Fiber Three-Path Mach-Zehnder Interferometer", Optics Letters, Vol. 21, No. 4, Feb. 15, 1996, pg. 302–304, which is incorporated herein by reference. Optical power launched in any one of the input fibers is equally divided among the three output fibers. The ports are numbered 0 through 5.

A second component used in the three-port routers is the well known optical splitter ("split") described in the aforementioned publication by Paul E. Green Jr. The split can be thought of as a tap with a 50% split ratio so that power at input port 0 is divided equally onto each of two output ports 1,2.

B. 3-Port Single Wavelength Router

Figure 7:
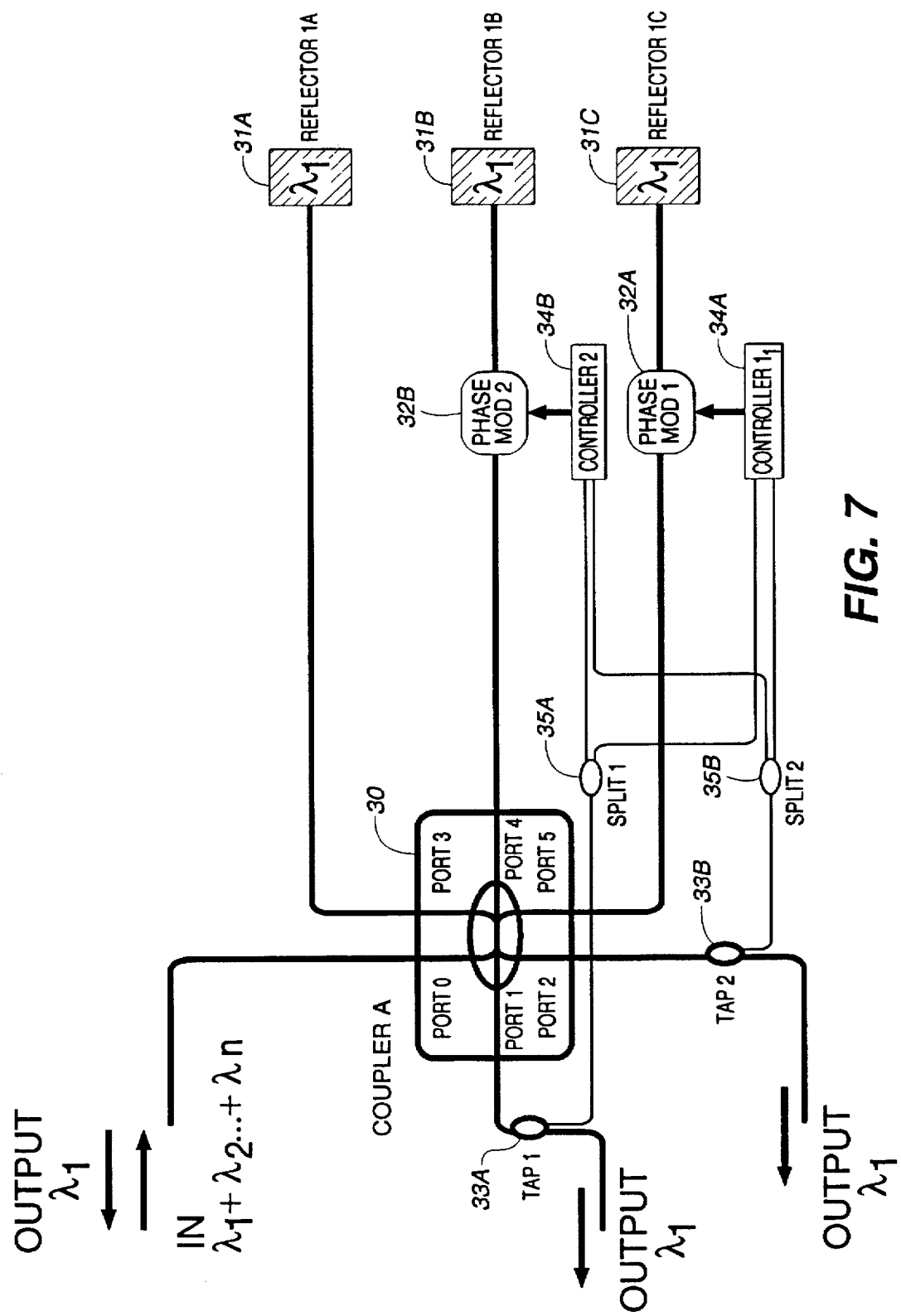
FIG. 7 is a schematic diagram of an all-fiber active 3-port, one wavelength optical router.

With such a 3×3 fused fiber coupler, used in conjunction with the previously described phase locking design, it is possible to make 3-port routers. FIG. 7 shows a 3-port, one wavelength router.

The input signal, at port 0 of 3×3 coupler 30, is equally divided among the ports 3, 4 and 5. Ports 4 and 5 have phase modulators 32B and 32A, respectively. Ports 3, 4, and 5 are terminated in identical fiber reflective gratings 31A, 31B, 31C. The reflected signals in the three arms of the interferometer interfere back at the 3×3 coupler 30. Depending on the phase of each of the 3 interfering signals, it is possible to route the wavelength signal back to port 0, or 1 or 2.

If port 1 is the desired output port, then the three interfering signals should all add constructively at port 1. The sample output of tap 33A provides a measure of the interfering signals. This power is further divided by split 35A, so that both controller 34A and controller 34B have a sample of the interference at port 1. Controller 34A uses this interference signal to detect its own unique dither frequency. Controller 34A adjusts the phase via phase modulator 32A so as to maximize the detected dither frequency associated with controller 34A. Likewise controller 34B also received a sample of the interference signal at port 1. Controller 34B uses this interference signal to detect its own unique dither frequency. Controller 34B adjusts the phase in its arm of the interferometer via phase modulator 32B so as to maximize the detected dither frequency associated with controller 34B. In this way, the phase in two arms of the interferometer is actively controlled so as to maintain complete constructive interference at port 1 of coupler 30, i.e., all the optical power associated with $\lambda_1$ is routed back to port 1 of coupler 30.

If port 2 is the desired output port, then the three interfering signals should all add constructively at port 2. The same procedure described above is applied once again. The phase in two arms of the interferometer is actively controlled so as to maintain complete constructive interference at port 2 of coupler 30.

C. 3-Port Two Wavelength Router

Figure 8:
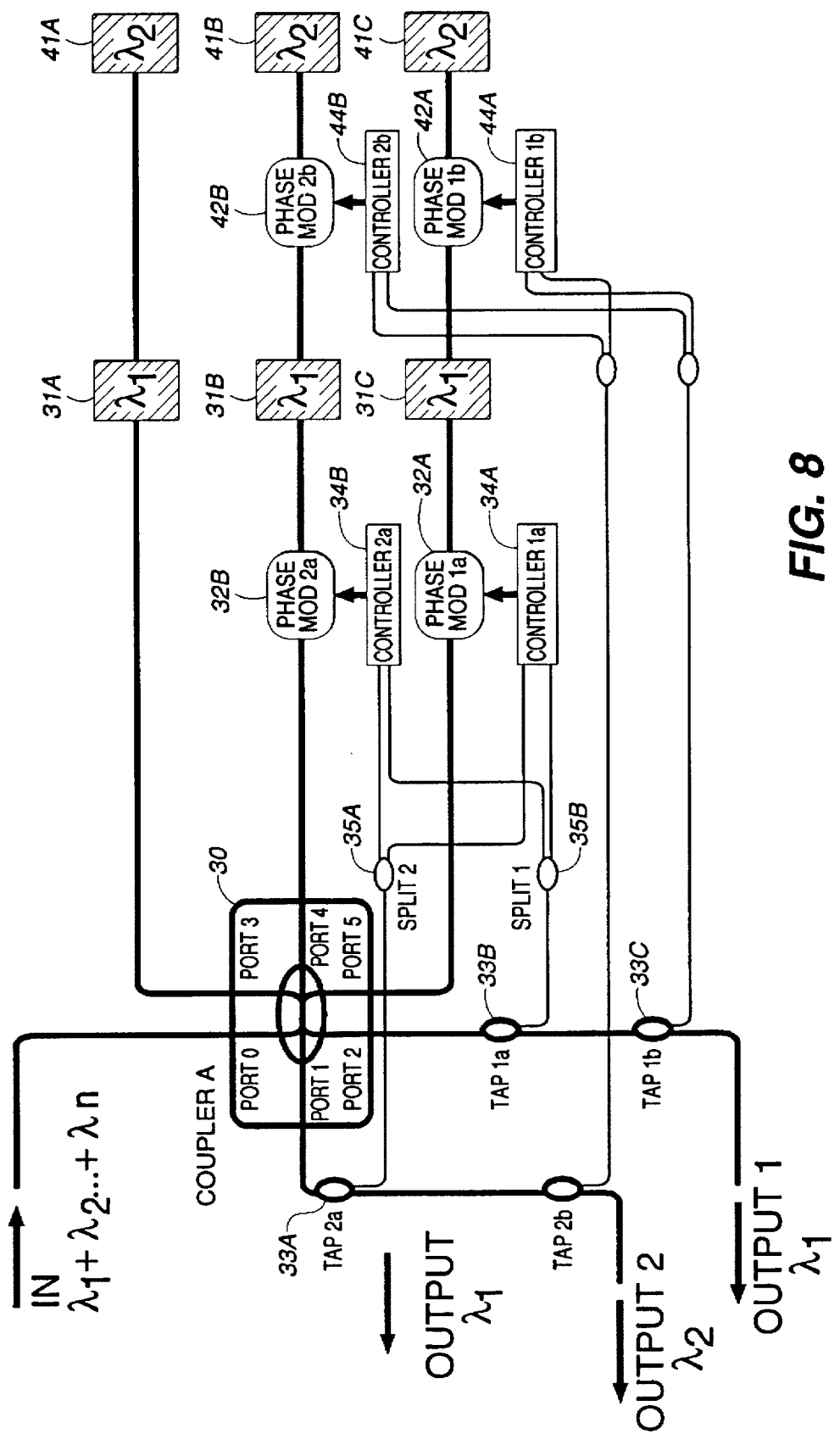
FIG. 8 is a schematic diagram of a 3-port, two wavelength optical router.

The previous design can be easily extended to route 2 different wavelengths. This is illustrated in FIG. 8. Here a second pair of phase modulators 42A, 42B and a second pair of controllers 44A, 44B have been included along with a second set of identical reflective fiber filters 41A, 41B, 41C. The operation is similar to that described above.

Either one or both wavelengths $\lambda_1$ and $\lambda_2$ can be routed to either port 1 and/or port 2 of coupler 30.

D. 3-Port N Wavelength Router

Figure 9:
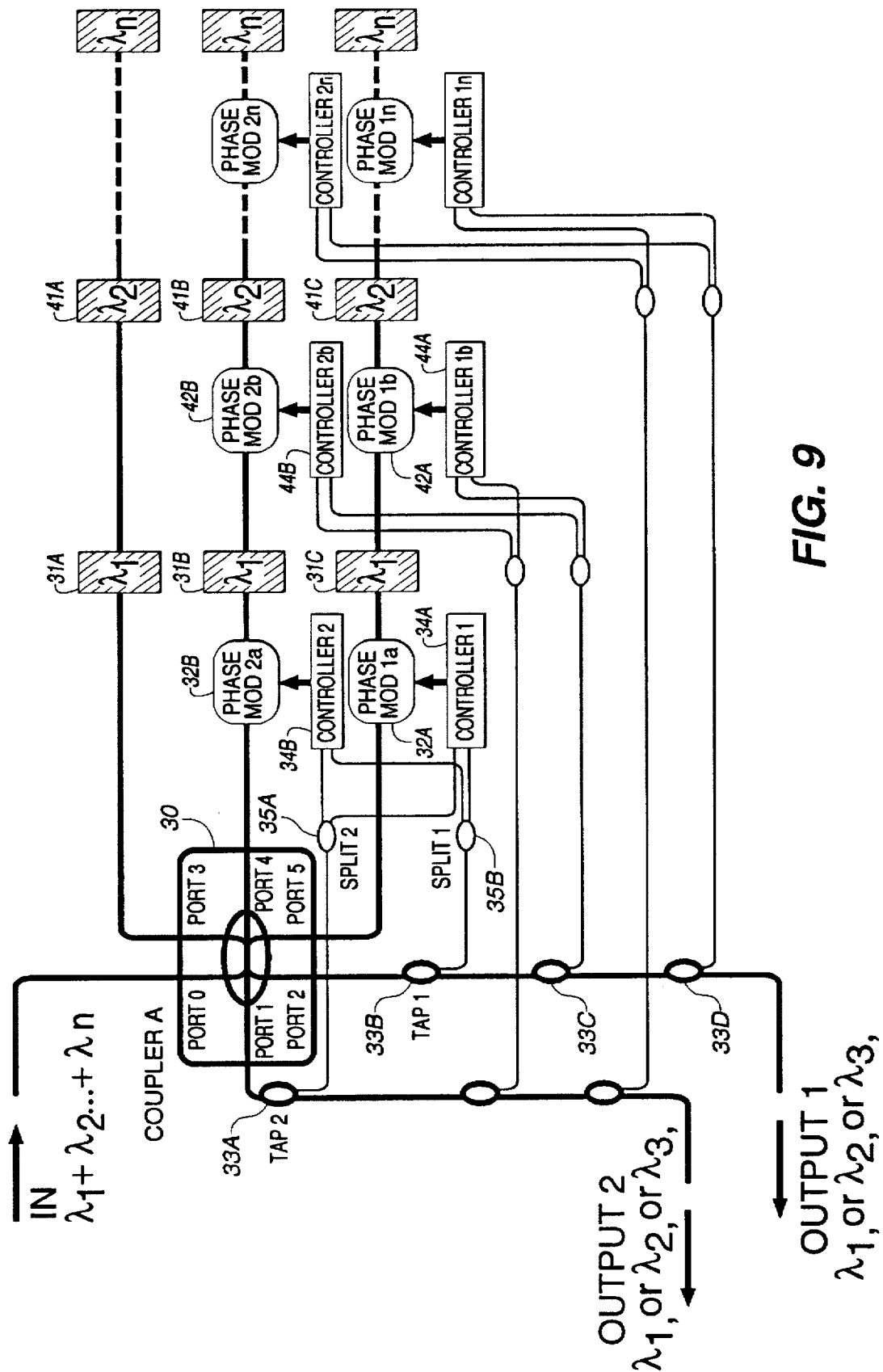
FIG. 9 is a 3-port, N-wavelength router.

The 3-port router can be extended to independently route N different wavelengths. This is illustrated in FIG. 9. This extension requires N sets of phase modulator pairs and N controller pairs along with N sets of three identical reflective fiber filters. In this case, either one or both wavelengths $\lambda_1$ and $\lambda_2$ can be routed to either port 1 and/or port 2 of coupler 30.

E. N-Port Single Wavelength All Fiber Active Add/Drop Multiplexer

The 3-port routers described above can be extended to form a complete active Add/Drop multiplexer, in the same way that the previously described 2×2 wavelength routers were extended into 2×2 Add/Drop Multiplexers.

Figure 10:
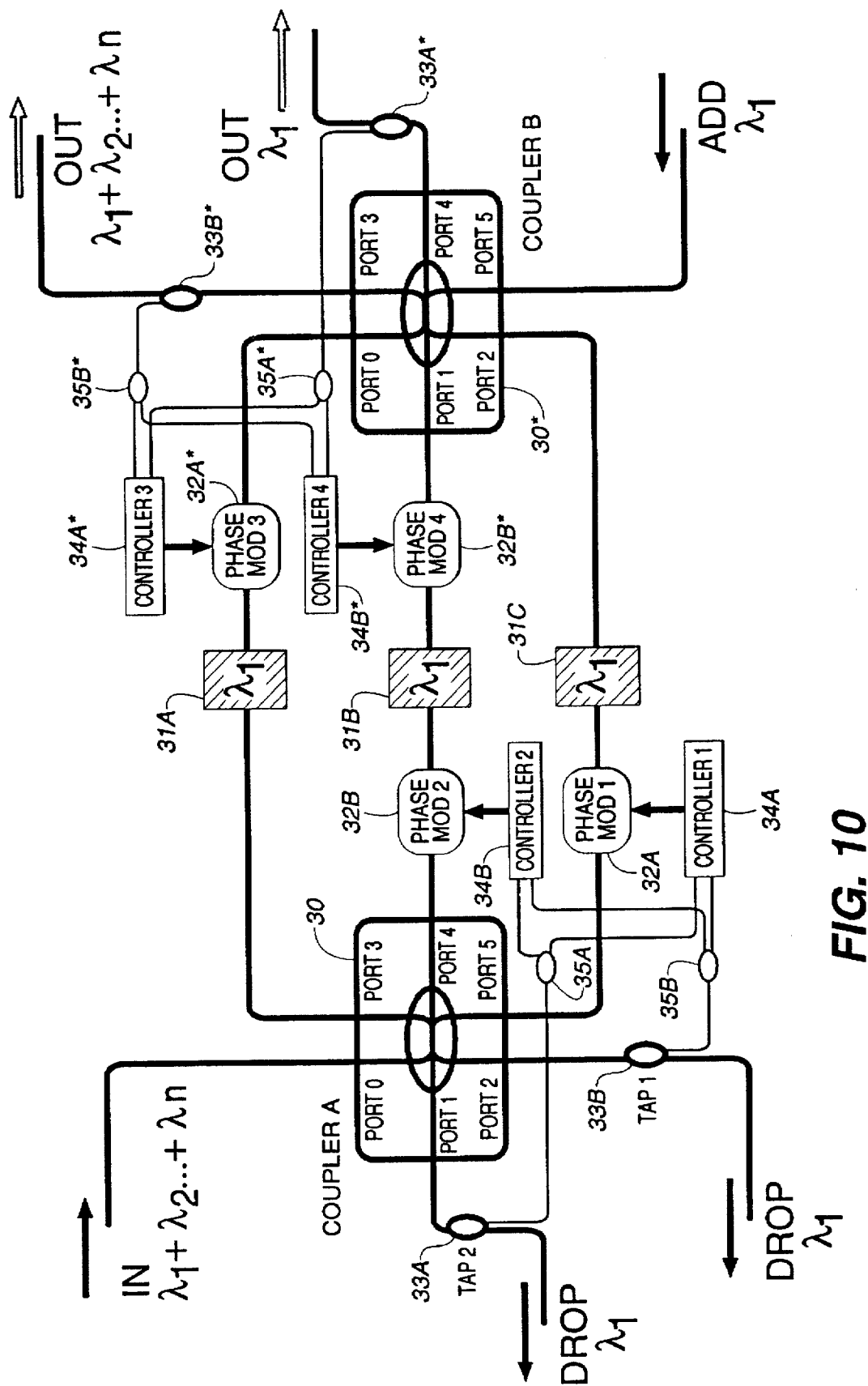
FIG. 10 is a schematic diagram of a 3-port, (i.e. 3×3) single wavelength optical cross connect.

FIG. 10 illustrates a 3-port single wavelength all-fiber active Add/Drop multiplexer (ADM). The Drop portion of the ADM is identical to the 3-port single wavelength described in connection with FIG. 7. The Add and Continue functions are similar to those previously described for the single wavelength 2×2 ADM of FIG. 4.

What is claimed:

1. An active optical router for dropping and directing at least one channel of wavelength $\lambda_1$ from a multiwavelength signal comprising:

a fiber directional coupler having first and second input ports and first and second output ports, said coupler capable of receiving said multiwavelength signal at said first input port;

a first fiber reflective grating for selectively reflecting wavelength $\lambda_1$ optically coupled to said first output port of said coupler;

a second fiber reflective grating for selectively reflecting wavelength $\lambda_1$ optically coupled by a phase modulator to said second output port of said coupler;

an optical tap optically coupled to said first input port of said coupler, one output of said tap coupled to a controller of said phase modulator and the other output of said tap providing said dropped channel of wavelength $\lambda_1$ selectively to either said first or said second input port of said coupler.

2. An optical router for dropping and directing a plurality of channels of respective wavelengths $\lambda_1, \lambda_2, \ldots, \lambda_n$ from a multiwavelength signal comprising:

a fiber directional coupler having first and second input ports and first and second output ports said coupler capable of receiving said multiwavelength signal at said first input port;

a first sequence of fiber reflective gratings for selectively reflecting wavelengths $\lambda_1, \lambda_2 \ldots, \lambda_n$ respectively, optically coupled to said first output port of said coupler;

a second sequence of fiber reflective gratings for selectively reflecting wavelengths $\lambda_1, \lambda_2, \ldots, \lambda_n$ respectively, alternating with respective phase modulators $P_1, P_2, \ldots P_n$, optically coupled to said second output port of said coupler;

a sequence of optical taps $T_1, T_2, \ldots, T_n$ optically coupled to said second input port of said coupler, one output of each said tap $T_i$ coupled to a controller of a corresponding phase modulator $P_i$ and the other output of said tap providing said dropped channel of corresponding wavelength $\lambda_i$ selectively to either said first or said second input port of said coupler.

3. An optical router for adding at least one channel of wavelength $\lambda_1$ to a multiwavelength signal comprising:

a fiber directional coupler having first and second input ports and first and second output ports, said coupler capable of receiving said multiwavelength signal at said input ports, and said coupler capable of receiving at said second output port said channel $\lambda_1$ to be added;

a first fiber reflective grating for selectively reflecting $\lambda_1$ optically coupled to said second input port of said coupler;

a second fiber reflective grating for selectively reflecting $\lambda_1$ coupled by a phase modulator to said first input port of said coupler;

an optical tap optically coupled to said first output port of said coupler, one output of said tap coupled to a controller of said phase modulator and the other output of said tap presenting said multiwavelength signal with said channel of wavelength $\lambda_1$ added.

4. An optical router for adding a plurality of channels of respective wavelengths $\lambda_1, \lambda_2, \ldots, \lambda_n$, to a multiwavelength signal comprising:

a fiber directional coupler having first and second input ports and first and second output ports said coupler capable of receiving said multiwavelength signal at said input ports, and said coupler capable of receiving at said second output port said channels $\lambda_1, \lambda_2, \ldots, \lambda_n$, to be added;

a first sequence of fiber reflective gratings for selectively reflecting $\lambda_1, \lambda_2, \ldots, \lambda_n$, respectively, optically coupled to said second input port of said coupler;

a second sequence of fiber reflective gratings for selectively reflecting $\lambda_1, \lambda_2, \ldots, \lambda_n$, respectively, said gratings alternating with respective phase modulators $P_1, P_2, \ldots, P_n$, optically coupled to said first input port of said coupler; and a sequence of optical taps $T_1, T_2, \ldots, T_n$ optically coupled to said first output port of said coupler, one output of each said tap $T_i$ coupled to a controller of said respective phase modulator $P_i$ and the other output of said tap $T_i$ coupled to the input of succeeding tap $T_{i+1}$, the final tap $t_n$ presenting said multiwavelength signal with $\lambda_1, \lambda_2, \ldots, \lambda_n$ added.

5. An optical cross connect for add/drop multiplexing comprising an optical router according to claim 1 or claim 2 optically coupled to a router for adding channels.

6. An optical cross connect for add/drop multiplexing comprising an optical router according to claim 3 or claim 4 optically coupled to a router for dropping channels.

7. An optical cross connect for dropping at least one channel of wavelength $\lambda_1$ from a multiwavelength signal comprising:

a three-fiber optical coupler having first, second and third input ports and first, second and third output ports, one of said input ports capable of receiving said input signal a first reflective grating for selectively reflecting $\lambda_1$ optically coupled to said first output port;

a second reflective grating for selectively reflecting $\lambda_1$ coupled to said second output port through a first phase modulator;

a third reflective grating for selectively reflecting $\lambda_1$ coupled to said third output port through a second phase modulator;

a first tap coupled to said second input port having one of its outputs coupled via a split to respective controllers for said first and second phase modulators;

a second tap coupled to said third input port having one of its outputs connected to respective controllers for said first and second phase modulators, each of said first and second taps presenting at their remaining outputs said channel of wavelength $\lambda_1$.

* * * * *